United States Patent
Zimmer et al.

(10) Patent No.: US 9,908,205 B2
(45) Date of Patent: Mar. 6, 2018

(54) HEAT EXCHANGER EXPANDED OVERLAP JOINT

(75) Inventors: Donald N. Zimmer, Marshalltown, IA (US); Floyd E. Cherington, Carrollton, TX (US); Randy D. Smith, Marshalltown, IA (US)

(73) Assignee: Lennox Industries Inc., Richardson, TX (US)

( * ) Notice: Subject to any disclaimer, the term of this patent is extended or adjusted under 35 U.S.C. 154(b) by 1308 days.

(21) Appl. No.: 12/834,547

(22) Filed: Jul. 12, 2010

(65) Prior Publication Data

US 2011/0174302 A1 Jul. 21, 2011

Related U.S. Application Data

(60) Provisional application No. 61/295,501, filed on Jan. 15, 2010.

(51) Int. Cl.
| | |
|---|---|
| *F24H 3/00* | (2006.01) |
| *B23P 15/00* | (2006.01) |
| *F23D 14/58* | (2006.01) |
| *F23D 14/34* | (2006.01) |
| *F24H 3/08* | (2006.01) |
| *F24H 8/00* | (2006.01) |
| *B29C 45/18* | (2006.01) |
| *F25D 21/14* | (2006.01) |
| *F24H 9/20* | (2006.01) |
| *B29L 31/18* | (2006.01) |

(52) U.S. Cl.
CPC .............. *B23P 15/00* (2013.01); *B29C 45/18* (2013.01); *F23D 14/34* (2013.01); *F23D 14/58* (2013.01); *F24H 3/087* (2013.01); *F24H 8/006* (2013.01); *F24H 9/2035* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
CPC . F24H 3/10; F24H 3/107; F24H 3/105; F28D 9/0031; F28D 9/0037; B21D 39/00; B21D 19/14; B21D 19/082; B21D 19/088; B21D 19/12; B21D 19/16; B23P 11/005; B23P 11/00
USPC .......................................... 126/90 R; 165/170
See application file for complete search history.

(56) References Cited

U.S. PATENT DOCUMENTS 3,940,837 A * 3/1976 Wiese ....................... 29/890.044
4,467,780 A * 8/1984 Ripka ....................... 126/110 R
(Continued)

FOREIGN PATENT DOCUMENTS

FR 2272769 A1 * 12/1975 ............. B21D 39/06

*Primary Examiner* — Jason Lau
(74) *Attorney, Agent, or Firm* — Hubbard Johnston, PLLC

(57) ABSTRACT

A furnace heat exchanger assembly includes first and second heat exchanger halves. The first heat exchanger half includes a first half of an exhaust channel and an inner joint flange half at an end thereof. The second heat exchanger half includes a second half of the exhaust channel and an outer joint flange half at an end thereof having first and second capturing tabs. The first and second heat exchanger halves are coupled together such that the first and second capturing tabs substantially overlap the inner joint flange half to form a joint flange.

6 Claims, 12 Drawing Sheets

(56) References Cited

U.S. PATENT DOCUMENTS

| | | | | |
|---|---|---|---|---|
| 4,649,894 | A * | 3/1987 | Hoeffken | B23P 11/00 |
| | | | | 126/119 |
| 4,738,307 | A * | 4/1988 | Bentley | 165/133 |
| 4,738,308 | A * | 4/1988 | Moranne | 165/149 |
| 5,307,870 | A * | 5/1994 | Kamiya | F28F 1/022 |
| | | | | 165/153 |
| 5,359,989 | A * | 11/1994 | Chase et al. | 126/110 R |
| 5,439,050 | A * | 8/1995 | Waterman et al. | 165/170 |
| 5,997,285 | A * | 12/1999 | Carbone et al. | 431/354 |
| 6,109,254 | A * | 8/2000 | Reinke et al. | 126/110 R |
| 7,096,933 | B1 * | 8/2006 | Zia et al. | 165/170 |
| 2002/0040777 | A1 * | 4/2002 | Tomlinson et al. | 165/163 |
| 2003/0102115 | A1 * | 6/2003 | Lengauer, Jr. | F24H 3/105 |
| | | | | 165/170 |
| 2003/0127087 | A1 * | 7/2003 | Hill et al. | 126/99 R |
| 2003/0127218 | A1 * | 7/2003 | Sears et al. | 165/170 |

* cited by examiner

HEAT EXCHANGER EXPANDED OVERLAP JOINT

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference in its entirety. This application is related to U.S. application Ser. No. 12/834,660, filed by Donald N. Zimmer, et al. on Jul. 12, 2010 entitled "Reflare Tool and Process", commonly assigned with this application and incorporated herein by reference.

TECHNICAL FIELD

The present disclosure is directed, in general, to an HVAC system, and more specifically, to a heat exchanger assembly.

BACKGROUND

Many high-efficiency furnace designs employ a heat exchanger assembly including several serpentine heat exchangers. Hot exhaust gases from a burner associated with a particular heat exchanger travel through the serpentine path while an airstream to be warmed is forced over the heat exchanger. The airstream is thereby warmed as heat is extracted from the exhaust gas.

The heat exchanger is typically fastened to one or more metal plates that serve to mechanically support the heat exchanger assembly and to guide the airstream being warmed by the assembly. It is essential that the joints between the several heat exchangers and the one or more metal plates be well sealed to prevent exhaust gas from entering the airstream.

SUMMARY

In one aspect, the disclosure provides a furnace heat exchanger assembly that includes a first and a second heat exchanger half. The first heat exchanger half includes a first half of an exhaust channel and an inner joint flange half at an end thereof. The second heat exchanger half includes a second half of the exhaust channel and an outer joint flange half at an end thereof. The outer joint flange half includes first and second capturing tabs. The first and second heat exchanger halves are coupled together such that the first and second capturing tabs substantially overlap the inner joint flange half to form a joint flange.

In another aspect, a furnace is provided that includes a panel exhaust port. A heat exchanger is coupled to the panel exhaust port with a flare-crimp joint. The heat exchanger includes a first and a second heat exchanger half. The first heat exchanger half includes a first half of an exhaust channel and an inner joint flange half at an end thereof. The second heat exchanger half includes a second half of the exhaust channel and an outer joint flange half at an end thereof having first and second capturing tabs. The first and second heat exchanger halves are coupled together such that the first and second capturing tabs substantially overlap the inner joint flange half to form a joint flange.

In yet another aspect, a method of forming a furnace heat exchanger assembly is provided. The method includes providing a first heat exchanger half that includes a first half of an exhaust channel and an inner joint flange half at an end thereof. A second heat exchanger half is provided that includes a second half of the exhaust channel and an outer joint flange half at an end thereof. The outer joint flange half includes first and second capturing tabs. The first heat exchanger half is joined to the second heat exchanger half such that the capturing tabs substantially overlap the inner joint flange half to form a joint flange.

BRIEF DESCRIPTION OF THE DRAWINGS

Reference is now made to the following descriptions taken in conjunction with the accompanying drawings, in which.

DETAILED DESCRIPTION

In many cases each heat exchanger in a heat exchanger assembly is formed by joining corresponding halves (e.g. "clamshells") that are in turn formed from stamped sheet metal. The halves may be designed such that a joint flange is formed at each end of an exhaust channel when the halves are joined. The joint flange may be inserted into a corresponding exhaust port formed in a metal plate, such as a plenum wall, and crimped in some manner.

A conventional crimping process typically produces a gap between the two heat exchanger halves at the crimp joint, as the joint flange is deformed by the crimping process. Conventional practice includes using a sealant, such a high temperature RTV compound, to seal the crimp joint to ensure no more than negligible leakage of gas between the heat exchanger and the airstream passing thereover. Such use of sealant is undesirable in several respects, including cost, additional assembly time, and the possibility of leaks forming as the sealant ages.

To address such deficiencies of conventional practice, the present disclosure describes novel and innovative embodiments of a furnace heat exchanger, a furnace, and a method of forming a furnace heat exchanger. Embodiments of the disclosure overcome the deficiencies of conventional practice in part by forming a joint flange at each end of the heat exchanger that forms a metal seal between the two halves of the flange when the joint flange is crimped. Various embodiments thereby provide a crimp seal between the heat exchanger and the exhaust port to which the heat exchanger is joined that has greater reliability than a conventional crimpled flange, and may not require a sealant. Such embodiments may have lower cost, greater manufacturing efficiency, and increased reliability and safety of the assembled heat exchanger assembly relative to a conventional heat exchanger.

Figure 1:
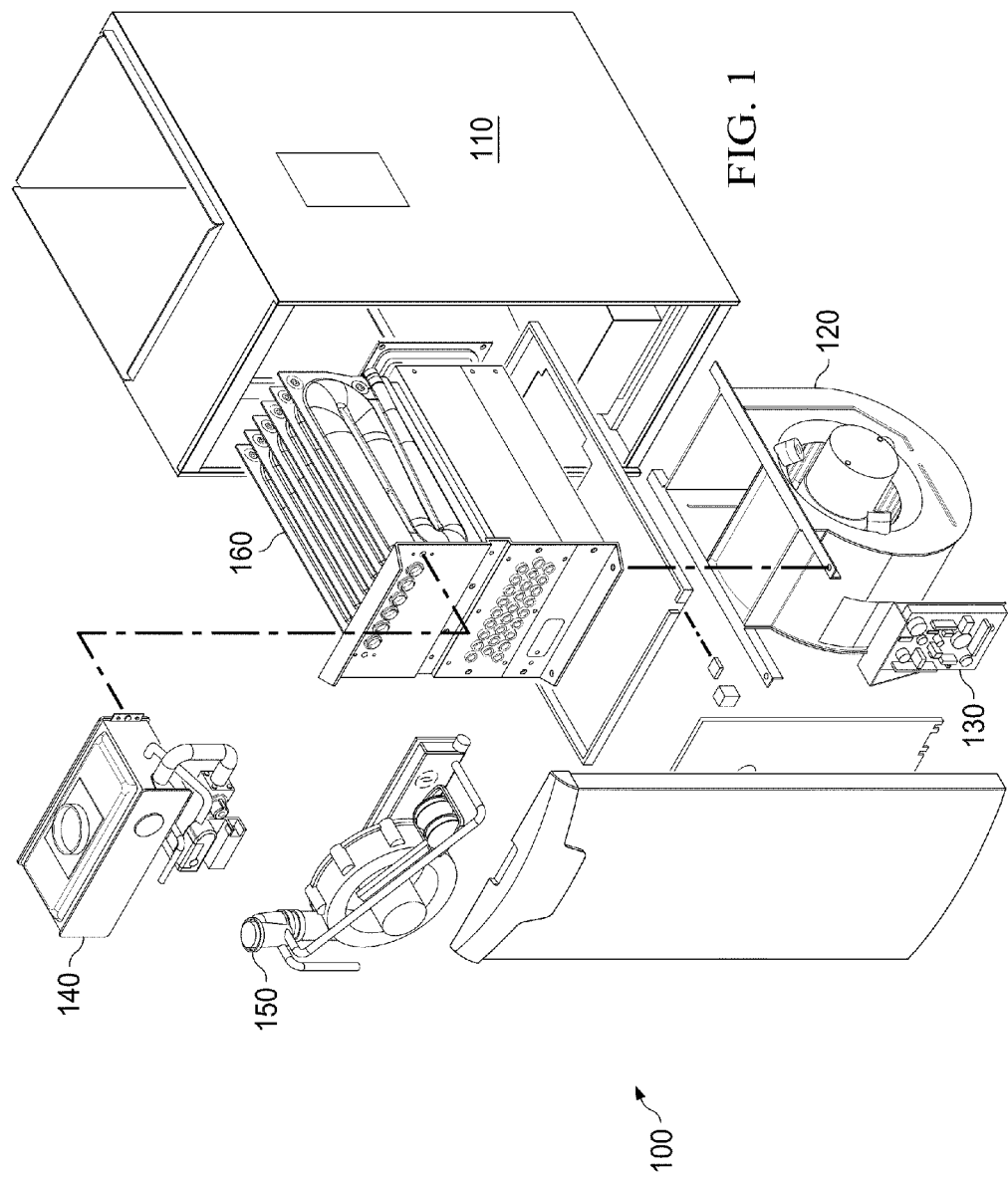
FIG. 1 illustrates a furnace unit of the disclosure.

Referring initially to FIG. 1, illustrated is a furnace 100 of the disclosure. The furnace 100 is described without limitation in terms of a gas-fired system. Those skilled in the pertinent art will appreciate that the principles disclosed herein may be extended to furnace systems using other fuel types. The furnace 100 includes various subsystems that may be conventional. A cabinet 110 encloses a blower 120, a controller 130, a burner box 140, and an induction fan 150. A heat exchanger assembly 160 is configured to operate with the burner box 140 and the induction fan 150 to burn a heating fuel, e.g. natural gas, and move exhaust gases through the heat exchanger assembly 160. The controller 130 may further control the blower 120 to move an airstream over the heat exchanger assembly 160, thereby transferring heat from the exhaust gases to the air stream.

Figure 2A:
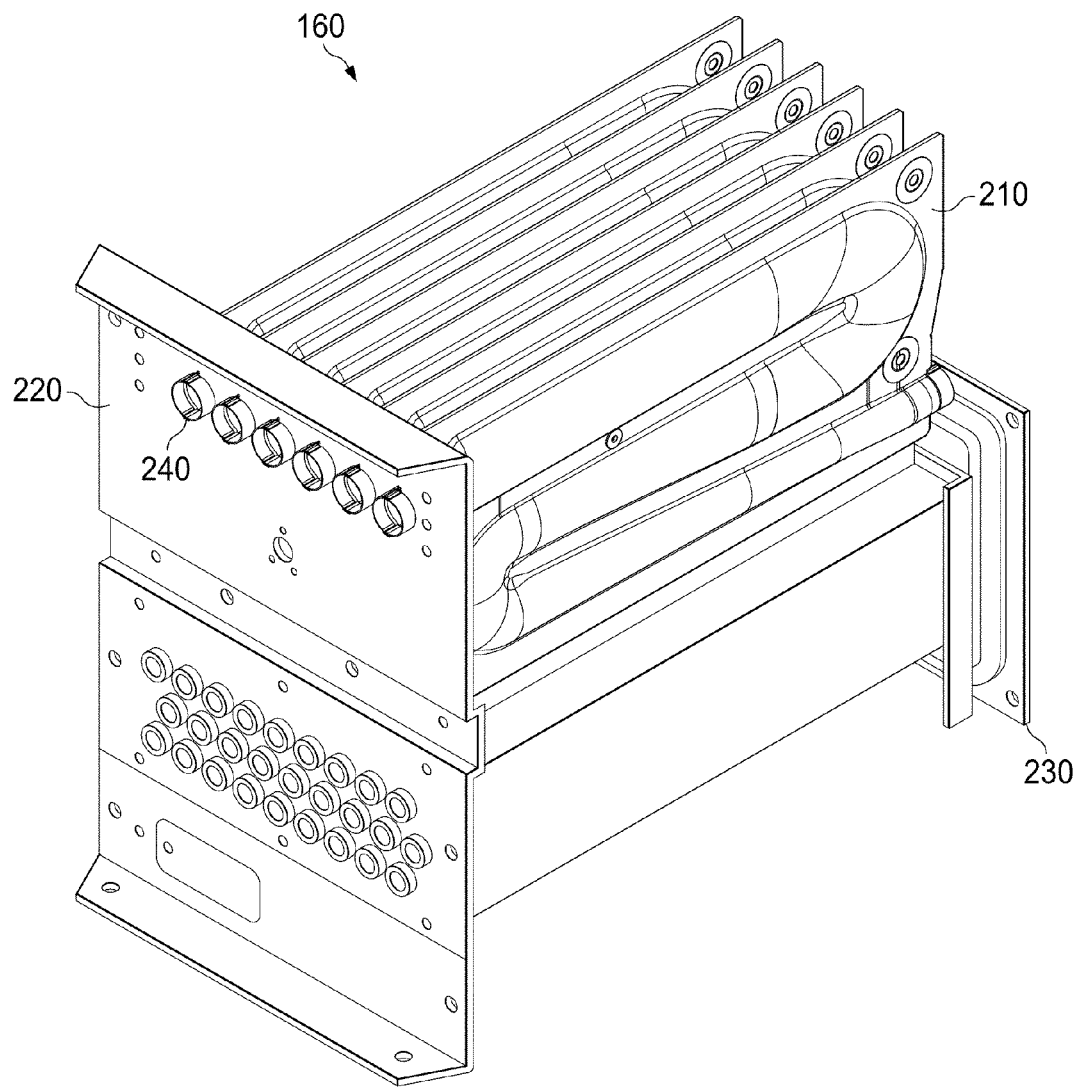
FIGS. 2A and 2B illustrate a heat exchanger assembly of the disclosure.
Figure 2B:
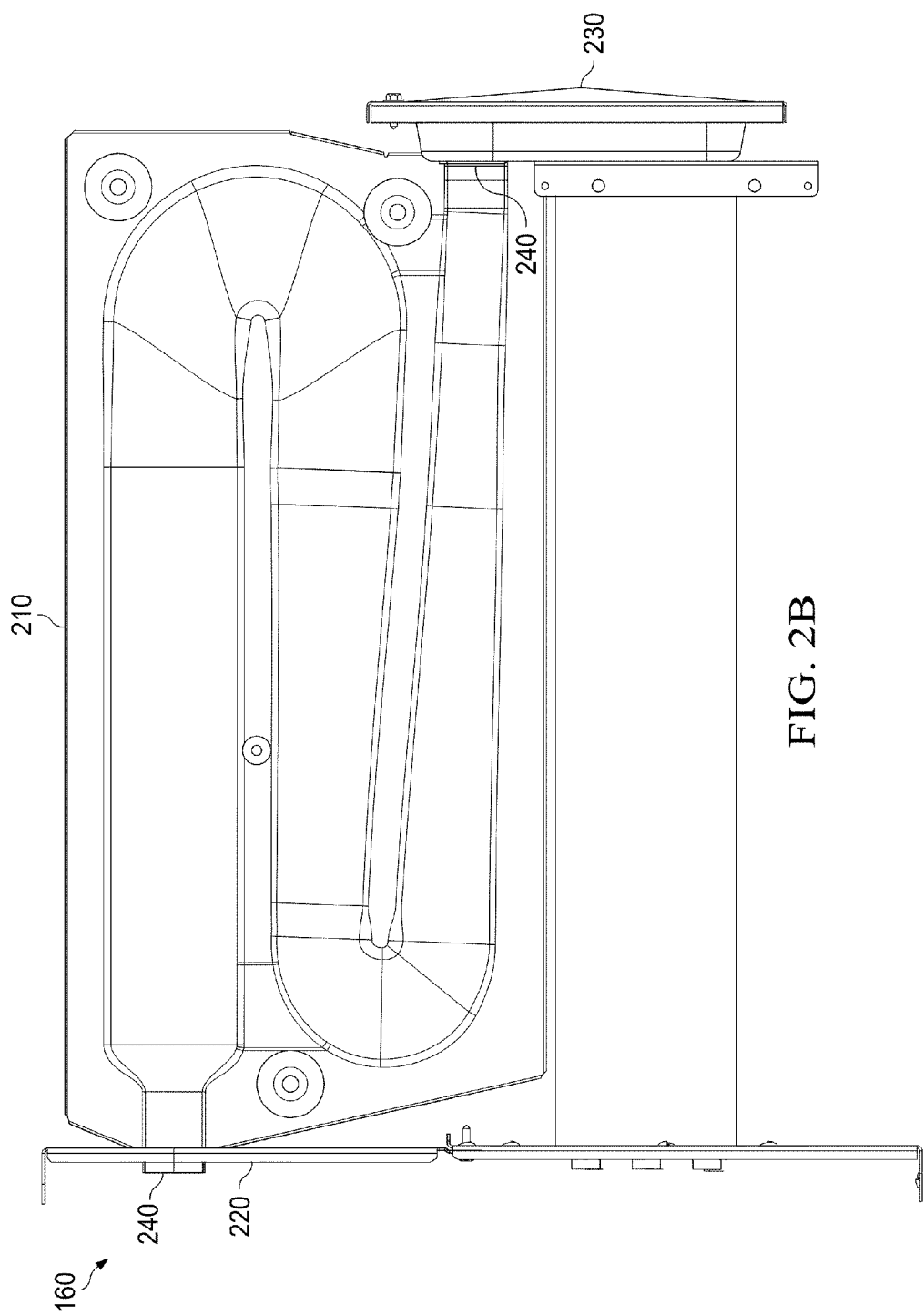

FIGS. 2A and 2B respectively present an oblique projection and a plan view of the heat exchanger assembly 160. A plurality of heat exchangers 210 are joined to a vest panel 220 and a collector box 230 by flare-crimp joints 240. The illustrated heat exchanger assembly 160 is provided by way of example without limitation to a particular configuration of heat exchangers and components to which the heat exchangers are joined. For example, a "U"-shaped heat exchanger may be used with appropriate reconfiguration of the furnace 100.

Figure 3:
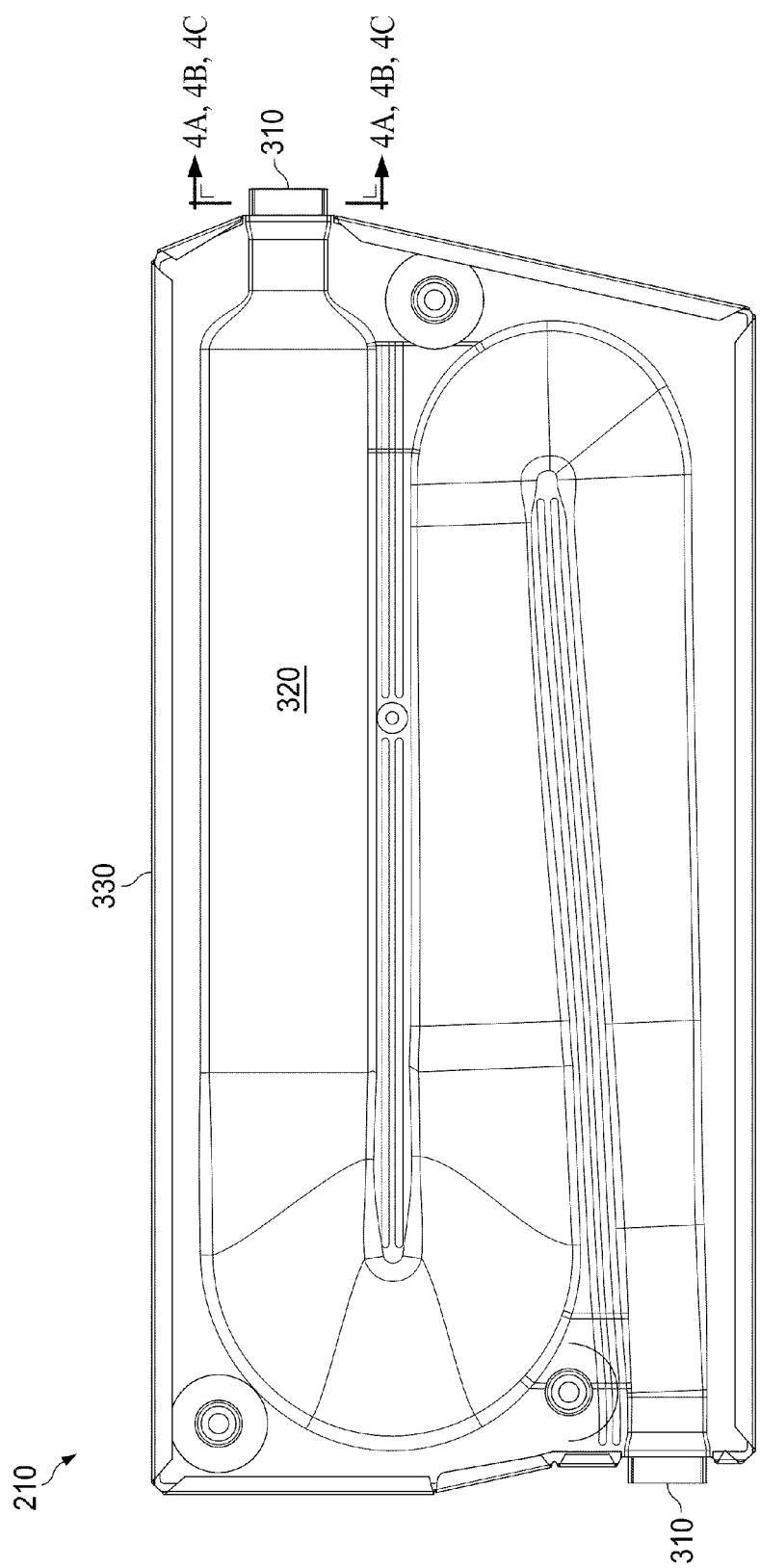
FIG. 3 illustrates aspects of a single heat exchanger of the disclosure, including joint flanges.

Turning to FIG. 3, illustrated is a single heat exchanger 210. The heat exchanger 210 includes joint flanges 310 at each end of a serpentine exhaust channel 320. With the exception of the flanges 310, the heat exchanger 210 may be conventional or novel. For example, sheet metal may be formed, e.g., by stamping, into two halves of a clamshell assembly and joined by a crimping process that forms crimp seals 330. The heat exchanger 210 may be formed of any type of sheet metal stock suitable for use in heat exchanger applications. In illustrative embodiments, the clamshells may be formed from 0.74 mm (29 mil) T1-40 EDDS aluminized steel, 0.74 mm (29 mil) 409 stainless steel, 0.86-0.91 mm (34-36 mil) aluminized type 1 DQHT steel, or 0.74 mm (29 mil) aluminized type 1 DQHT steel. Each of the above thicknesses is approximate, allowing for appropriate supplier tolerances.

Figure 4C:
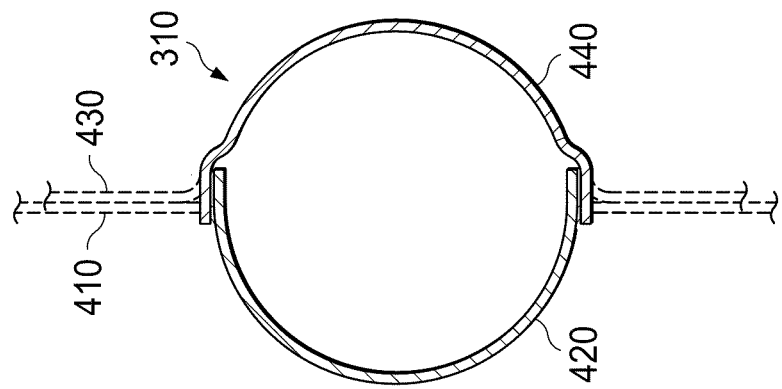
FIGS. 4A-4C illustrate two halves of the heat exchanger, and a joint flange of the disclosure.
Figure 4B:
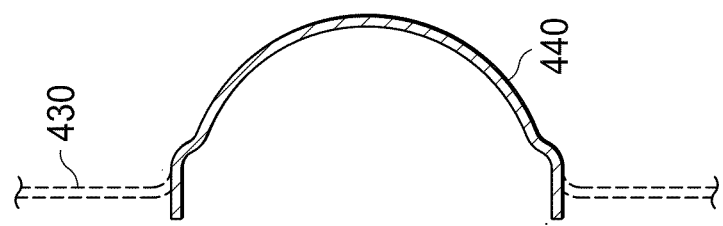
Figure 4A:
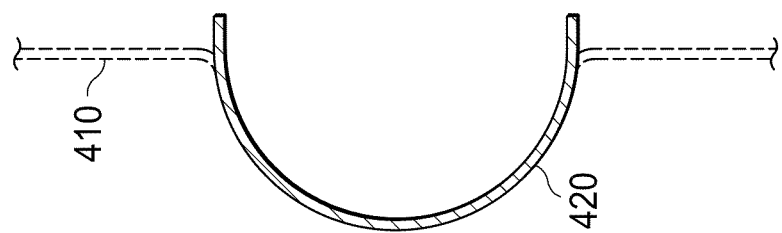

Turning to FIGS. 4A-4C, illustrated are the two halves of the heat exchanger 210 viewed through the section as marked in FIG. 3. FIG. 4A illustrates a first half 410 of the heat exchanger 210, including an inner flange half 420. FIG. 4B illustrates a second half 430 of the heat exchanger, including an outer flange half 440. FIG. 4C illustrates the two heat exchanger halves 410, 430 after joining thereof, thereby forming the joint flange 310.

Figure 5A:
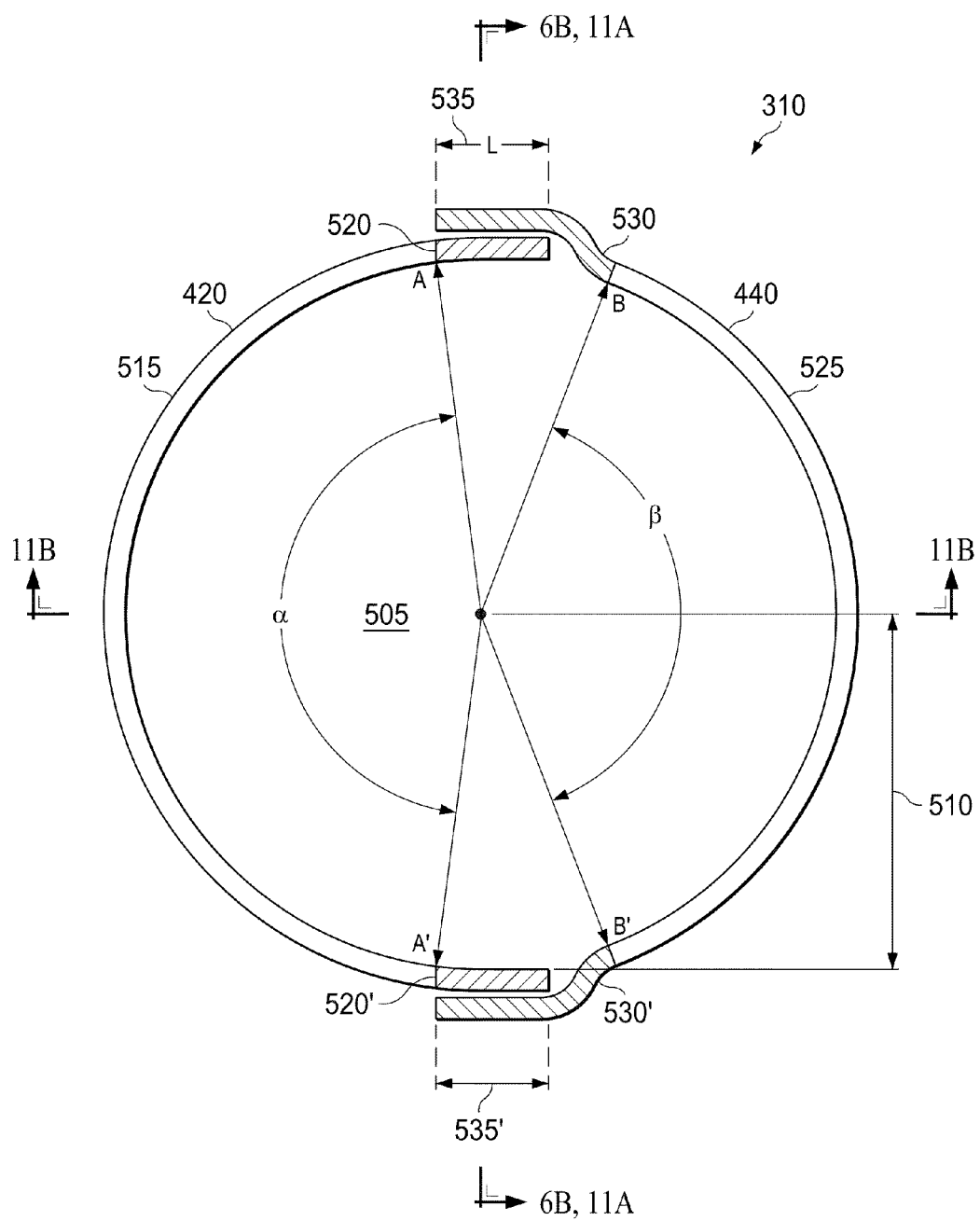
FIGS. 5A-5C illustrate aspects of a heat exchanger flange of the disclosure.

FIG. 5A illustrates the joint flange 310 in greater detail. The joint flange 310 encloses an opening 505 having a flange radius 510. In some embodiments the flange radius 510 is about 1.25 cm (≈0.5"), though embodiments of the disclosure are not limited to any particular value.

The inner flange half 420 includes a major portion 515, and first and second terminating portions 520, 520'. The major portion 515 describes an arc A-A'. The terminating portions 520, 520' include those portions of the inner flange half 420 that overlap portions of the outer flange half 440 when the flange halves 420, 440 are assembled. The outer flange half 440 includes a minor portion 525, and first and second capturing tabs 530, 530'. The minor portion 525 describes an arc B-B'. The capturing tabs 530, 530' include those portions of the outer flange half 440 that overlap portions of the inner flange half 420 when the flange halves 420, 440 are assembled, and s-curve portions as described below. The major portion 515 and the minor portion 525 may each be referred to herein and in the claims as a single-layer portion of the joint flange 310, as each includes only a single metal layer.

The arcs A-A' and B-B' are illustrated having a radius of curvature that is about constant, e.g. the flange radius 510. However, embodiments for which the radius of curvature is not constant are contemplated. For example, the arcs A-A' and B-B' may describe portions of an oval or ellipse, or include a notch or keyed portion.

The terminating portions 520, 520' may each have a same or different radius of curvature $\rho_t$ than a radius of curvature $\rho_{A-A'}$ of the major portion 515. In various embodiments $\rho_t$ is greater than $\rho_{A-A'}$. Thus, the terminating portions 520, 520' may be "flatter" than the major portion 515 to aid assembly of the flange halves 420, 440. In some such embodiments, $\rho_t$ may be at least two times $\rho_{A-A'}$. In some embodiments, it is preferred that $\rho_t$ is at least five times $\rho_{A-A'}$, while in some other embodiments it is more preferred that the terminating portions 520, 520' are about flat, e.g. wherein $\rho_t$ is at least ten times $\rho_{A-A'}$.

In the illustrated embodiment the inner flange half 420 follows the flange radius 510 over an angle α. This angle is related to the degree of overlap of the flange halves 420, 440. In some embodiments α is about 180°, but other angles are possible and contemplated. In some embodiments α is at least about 160°. In other embodiments, α is in a range between about 170° and about 190°, with a more preferred range between about 175° and about 185°.

In the illustrated embodiment the outer flange half 440 follows the flange radius 510 over an angle β. The disclosure is not limited to any particular value of β. In various embodiments β is in a range of about 145°-155°, with about 150° being preferred.

First and second overlap regions 535, 535' having an overlap length L include those portions of the flange halves 420, 440 adjacent to or in contact with each other, as illustrated in FIG. 5A. The first and second overlap regions 535, 535' may each be referred to herein and in the claims as a double-layer portion, since each overlap region 535, 535' includes a layer from the inner flange half 420 and a layer from the outer flange half 440. The first and second overlap regions 535, 535' form a seam in the flange 310 after attaching the heat exchanger 210 to an exhaust port, as described below.

Figure 5B:
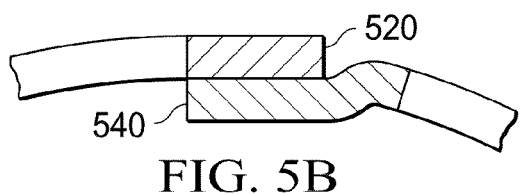

The capturing tab 530 is illustrated as being outside the terminating portion 520. By "outside", it is meant that the capturing tab 530 approximates an arc of a circle, centered on the opening 505, with a larger radius than the radius of a circle described by the major and minor portions 515, 525. However, embodiments in which the capturing tab 530 is inside the terminating portion 520, e.g. at a smaller radius, are within the scope of the disclosure. Such an embodiment is illustrated in FIG. 5B, for example, in which a capturing tab 540 replaces the capturing tab 530.

Figure 5C:
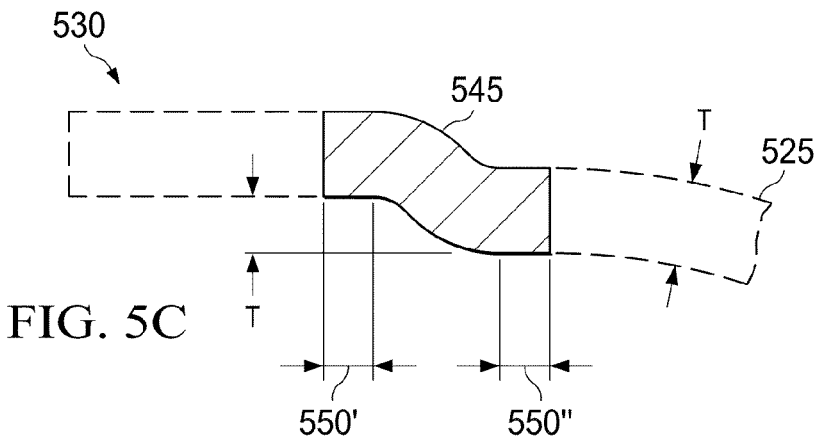

With reference to FIG. 5C, the capturing tab 535 includes an s-curve portion 545. The s-curve portion may include two portions 550', 550" having about equal radius of curvature, with an inflection therebetween. The s-curve portion 545 connects the minor portion 525 to the capturing tab 530. When the capturing tab 530 is outside the terminating portion 520, the capturing tab 530 is further from the center of the opening 505 than is the minor portion 525. Thus, the capturing tab is regarded as having a greater radius than is the minor portion 525.

Each of the capturing tab 530 and the minor portion 525 may be viewed as an arc of respective first and second circles respectively having the radius of the capturing tab 530 and the minor portion 525. Thus the minor portion 525 may be regarded as an arc having a first radius, and the capturing tab 530 may be regarded as an arc having a different second radius. Similarly, the terminating portion 520 may also be regarded as an arc having the second different radius, such as illustrated in FIG. 5B.

The length L of the overlap regions 535, 535' is such that the first and second capturing tabs 530, 530' substantially overlap the inner flange half 420 to form the joint flange 310. Herein and in the claims, "substantial overlap" and terms derived therefrom mean that the extent of overlap is such that when the joint flange 310 is flared and crimped as described below over an exhaust port ring or a similar structure, no gap forms between the inner and outer flange halves 420, 440 in the overlap region 535. Any overlap that does not prevent such a gap form forming is not substantial overlap as used herein.

The overlap needed to prevent gapping may be related to various aspects of the flange halves 420, 440, such as the flange radius 510 or the thickness, stiffness, malleability or surface finish of the sheet metal stock used to form the heat exchanger 210. In some embodiments, the capturing tabs 530, 530' substantially overlap the inner flange half 420 when the overlap regions 535, 535' have a length L of at least 2 mm. In some embodiments, the capturing tabs 530, 530' substantially overlap the inner flange half 420 when the overlap regions 535, 535' each include at least about 10° of a circle having a radius about equal to the flange radius 510. In some embodiments, the capturing tabs 530, 530' substantially overlap the inner flange half 420 when the overlap regions 535, 535' each include at least about 2% of the circumference a circle having a radius about equal to the flange radius 510.

In an illustrative embodiment, the inner and outer flange halves 420, 440 have a thickness of about 0.73 mm (0.029") and the flange radius 510 is about 12.7 mm (0.5"). The overlap length is at least about 2.5 mm (about 0.1"), preferably between about 3.0 mm (about 0.12 mm) about 4.0 mm (about 0.16 mm), more preferably between about 3.5 mm (0.14 mm) and about 4.0 mm. An overlap of about 4.0 mm represents about 18° of overlap, or about 5% of the circumference of a circle having a radius about equal to the flange radius 510.

Figures 6A, 6B, 6C:
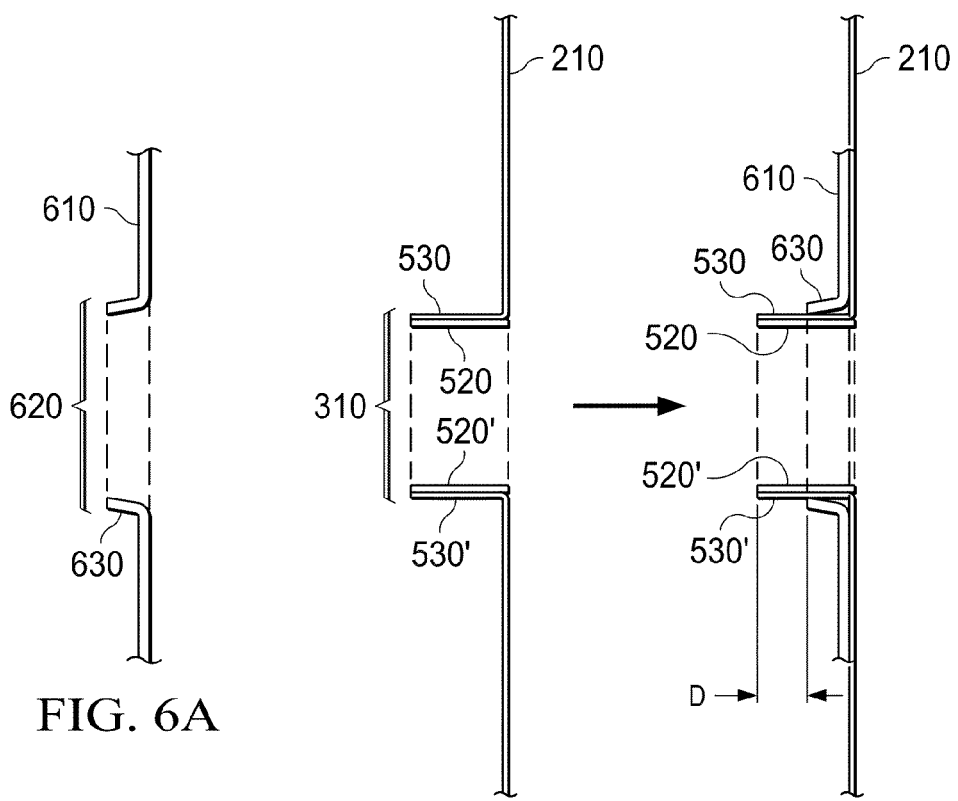
FIGS. 6A-6C illustrate a placement of a heat exchanger flange of the disclosure within a panel exhaust port of the disclosure.

Turning to FIG. 6A, illustrated is a panel 610 having an exhaust port 620. The panel 610 may be, e.g., a portion of the vest panel 220 or the collector box 230. The exhaust port 620 is bounded by a port ring 630, that may be formed, e.g., by extrusion or stamping. In various embodiments the exhaust port 620 has a diameter determined to provide sufficient clearance to allow the flange 310 of the heat exchanger 210 (FIG. 6B) to be inserted therethrough. For example, the clearance may be about 0.2 mm, but those of ordinary skill in the pertinent art may select any value appropriate to the particular characteristics of the process used. FIG. 6C illustrates the combined panel 610 and heat exchanger 210. The flange 310 extends beyond the port ring 630 by a distance D. As described further below, D is selected to provide sufficient material for the subsequent joining operation. In general, a preferred minimum value of D is related to the thickness of the sheet metal used to form the heat exchanger 210. In a nonlimiting example, D is about 5 mm (0.2") when the heat exchanger 210 has a thickness of about 0.73 mm (0.029").

Figure 6D:
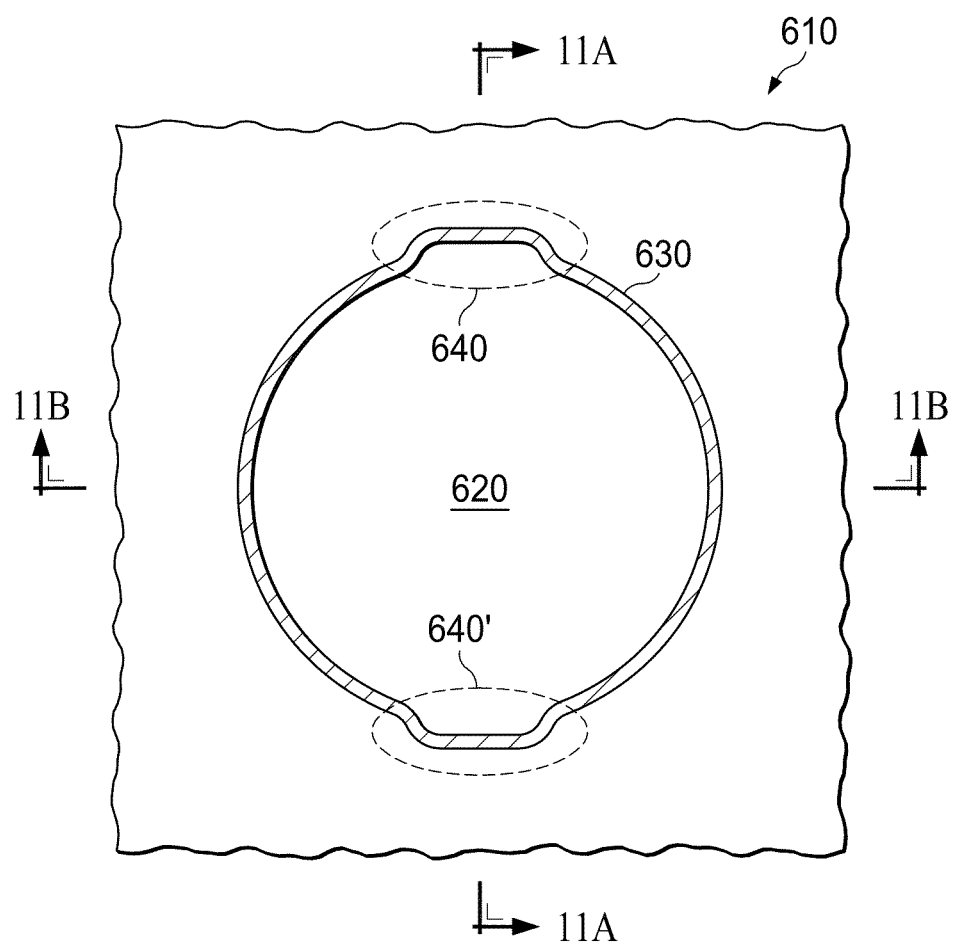
FIG. 6D illustrates a plan view of the panel exhaust port of FIG. 6A.

FIG. 6D illustrates an exhaust port 620 of the disclosure. The exhaust port 620 is configured to receive the flange 310. In embodiments in which the capturing tab 530 is outside the inner flange half 420, such as illustrated in FIG. 5A, the exhaust port 620 may include a first seam notch 640 and a second seam notch 640'. The seam notches 640, 640' are configured to allow the capturing tabs 530, 530' to pass therethrough with clearance, e.g., 0.2-0.3 mm, sufficient to avoid binding during assembly but small enough that the flare-crimp seal may be formed without leaks. In embodiments in which the capturing tab 530 is inside the inner flange half 420, the exhaust port 620 may be circular, e.g., without the seam notch 640, 640'.

Figures 7A, 7B:
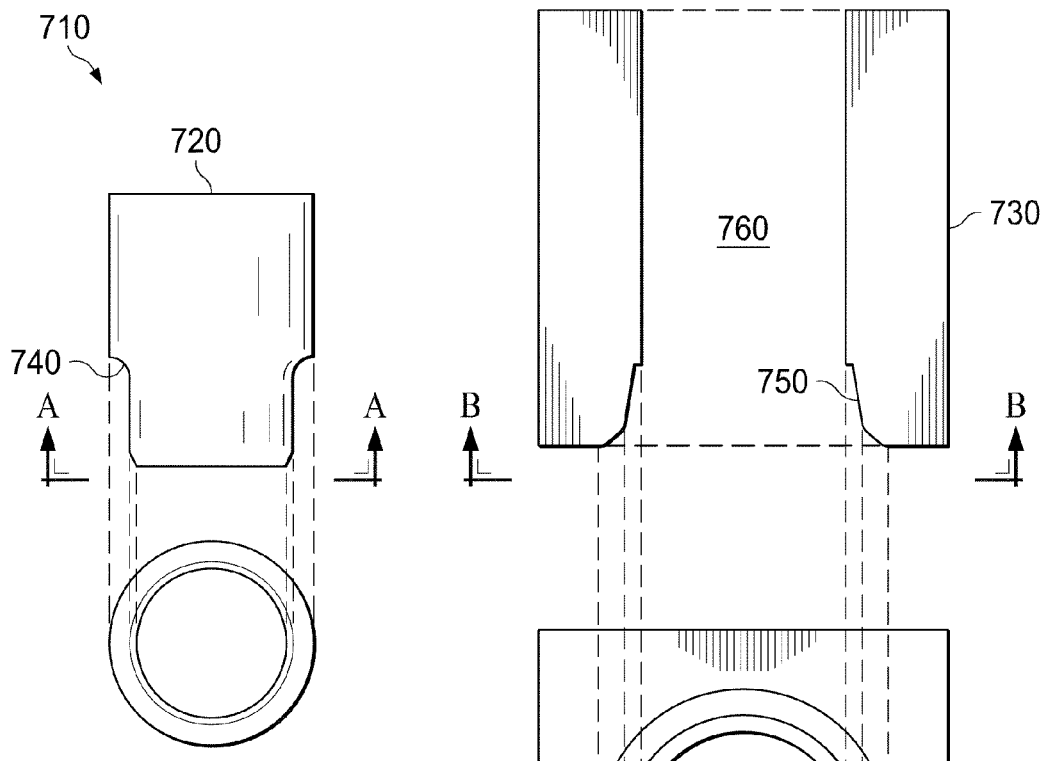
FIGS. 7A and 7B illustrate an embodiment of a flare-crimp tool set configured to form a flare-crimp joint between a joint flange and a panel exhaust port.

Turning now to FIG. 7, illustrated is a reflare tool 710 configured to form the flare-crimp joint 240 described herein. The illustrated embodiment is presented by way of example without limitation as a means to form the flare-crimp joint 240 as described herein. Additional details regarding the reflare tool 710 are included in patent application. Ser. No. 12/834,660, previously incorporated herein by reference. Those skilled in the pertinent art will appreciate that variations of the reflare tool 710 may be practiced to produce the described characteristics of the flare-crimp joint 240 without departing from the scope of the disclosure.

The reflare tool 710 includes a flaring body 720 and a crimping body 730. The flaring body 720 includes an inside corner 740 that flares the flange 310, as described further below. The crimping body 730 includes a crimping channel 750 that cooperates with the crimping body 730 to crimp the flange 310 to the port ring 630 after the flange 310 is flared.

The crimping body 730 includes a passageway 760. The passageway 760 has a sectional geometry that matches the sectional geometry of the flaring body 720, plus sufficient clearance so the flaring body 720 may slide within the passageway 760. A source of force, e.g. a hydraulic press (not shown), may be configured to independently apply force to the flaring body 720 and the crimping body 730.

Figure 8:
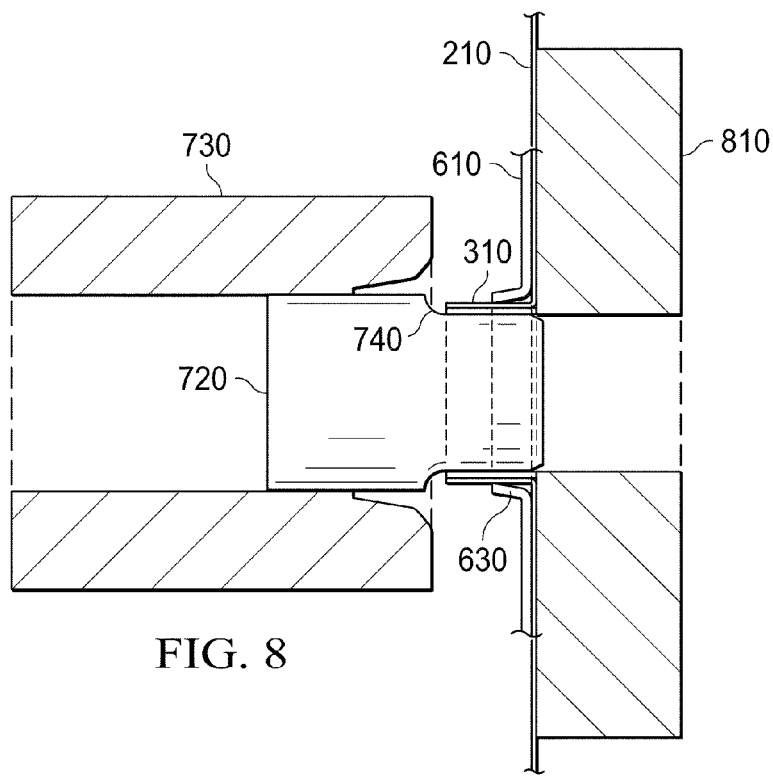
FIGS. 8-10 illustrate operation of the flare-crimp tool.
Figure 9:
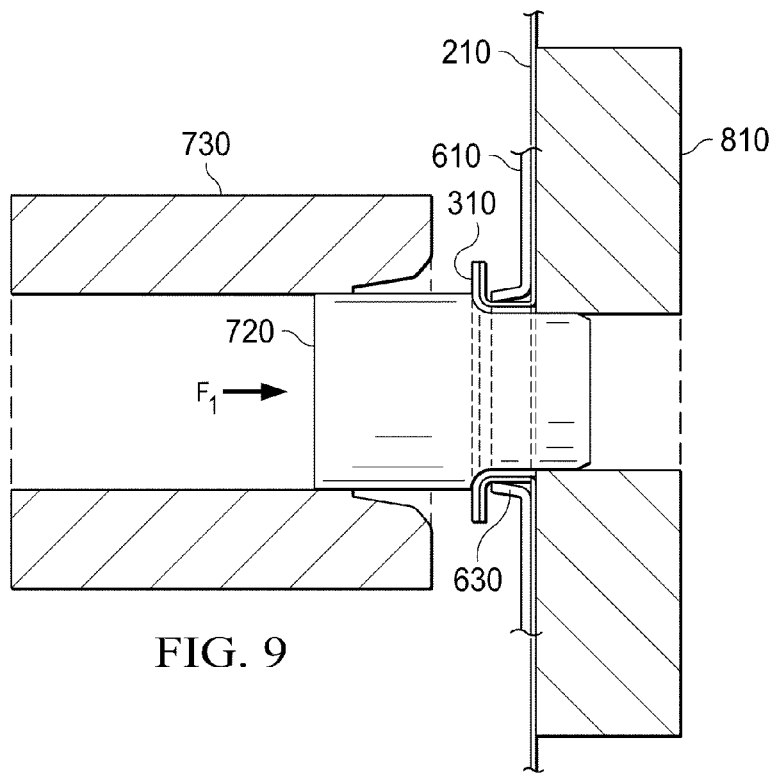
Figure 10:
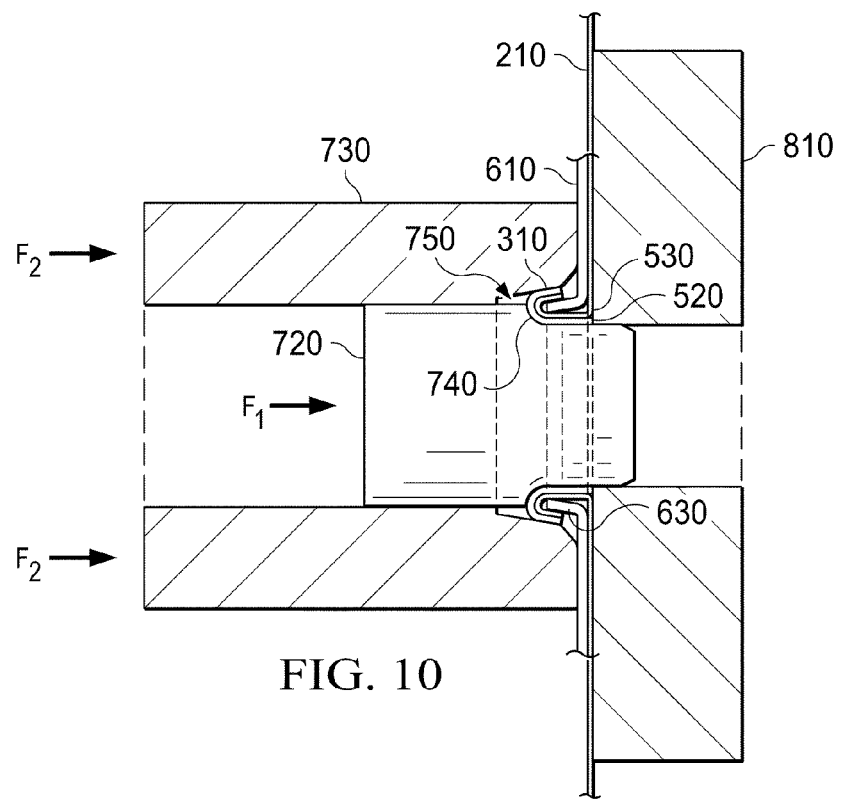

Turning now to FIGS. 8-10, operation of the reflare tool 710 is illustrated with continued reference to FIG. 7. The illustrated method is not exclusive of other methods that result in the flare-crimp joint as described herein. FIG. 8 illustrates a first step of a method of joining the heat exchanger 210 to the panel 610. In the illustrated embodiment the flaring body 720 is illustrated located in the passageway 760 of the crimping body 730. In other embodiments the crimping body 730 may be absent in this step. A backing plate 810 supports the combined heat exchanger 210 and panel 610 during the application of force to the flaring body 720. In the illustrated step, the flaring body 720 engages the flange 310. The inside corner 740 contacts the flange 310, but has not yet begun to flare the flange 310.

In FIG. 9, illustrated is a flaring step of the method. Force $F_1$ applied to the flaring body 720 has caused the flange 310 to flare away from the flaring body 720. The crimping body 730 may move or remain stationary with respect to the panel 610 during the flaring step. It may be preferable, however, to operate the crimping body 730 such that it does not obstruct the flange 310 as the flaring body 720 flares the flange 310.

In FIG. 10, illustrated is a crimping step of the method. Force $F_2$ applied to the crimping body 730 causes the flared portion of the flange 310 to roll over the port ring 630. The inside corner 740 and the crimping channel 750 confine the flared portion of the flange 310 during the rolling process.

The confining has the effect of forming a tight seal between the flange 310 and the port ring 630. Moreover, the confining restricts movement of the terminating portion 520 relative to the capturing tab 530 of the flange 310 (see FIG. 5A). Thus, the formation of a gap between halves of the flange 310 is advantageously avoided, resulting in a tight, leak-free seal with the port ring 630.

Figure 11A:
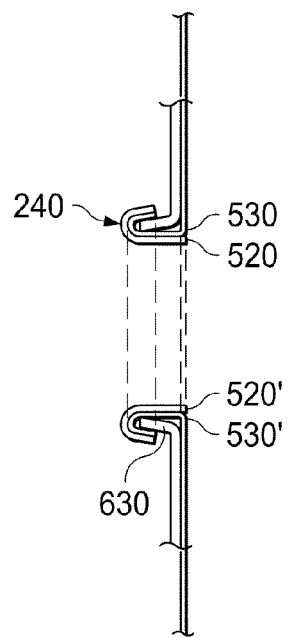
FIGS. 11A and 11B illustrate sectional views of a flare-crimp joint of the disclosure taken at positions marked in FIG. 6D.
Figure 11B:
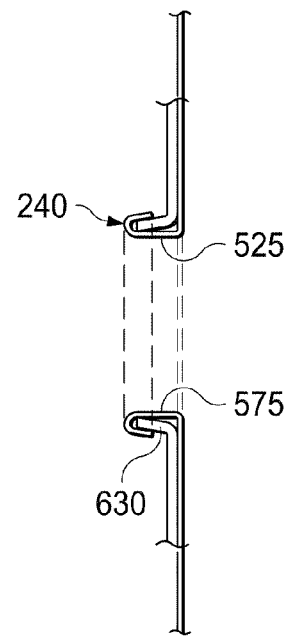

FIGS. 11A and 11B illustrate two sections through the flange 310 (see FIG. 6D) after forming the flare-crimp joint 240. The flare-crimp joint 240 as viewed in FIG. 11A includes the capturing tab 530 of the outer flange half 440 and the terminating portion 520 of the inner flange half 420. In FIG. 11B, the flare-crimp joint 240 includes only a single layer comprising the inner major portion 515 and the minor portion 525 (FIG. 5A).

The flare-crimp joint 240 is sealant-free, meaning that no sealant is needed to prevent leakage of gases from the heat exchanger 210 to the heated air stream. Even though the flare-crimp joint 240 is sealant-free, in some embodiments a sealant may be used for, e.g. for increased confidence that exhaust gas will not escape the heat exchanger 210. If a sealant is used, the flare-crimp joint 240 is still considered to be sealant-free by virtue of the gap-free metal-on-metal seal provided by the flare-crimp joint 240.

Figure 12:
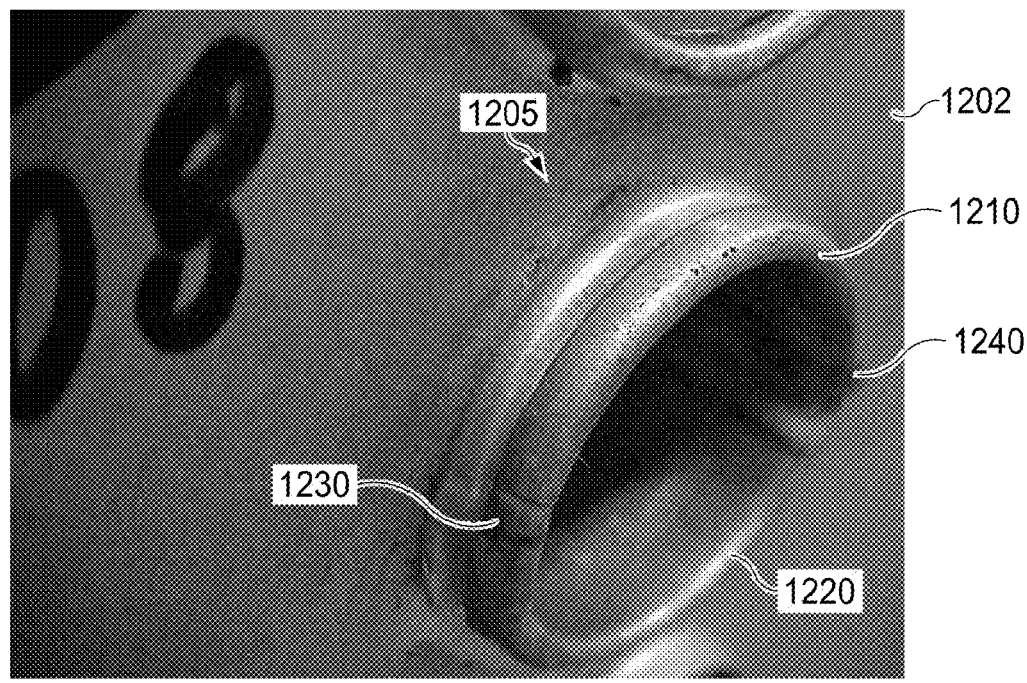
FIG. 12 presents a photograph of a manufactured flare-crimp joint of the disclosure.

FIG. 12 illustrates a photograph of a vest panel 1202 and an example flare-crimp joint 1205 as formed using a method within the scope of the disclosure. Notably, the flare-crimp joint 240 smoothly transitions from single-layer portions 1210, 1220 to double-layer portions (seams) 1230, 1240 that include two metal layers, e.g., the capturing tab 530 and the terminating portion 520. Advantageously, and in contrast to conventional practice, the flare-crimp joint 1205 does not include any sealant, and none is necessary. The flare-crimp joint 1205 forms a tight seal with the vest panel 1202, preventing leakage of exhaust gases, and obviating the need for any sealant.

Figure 13:
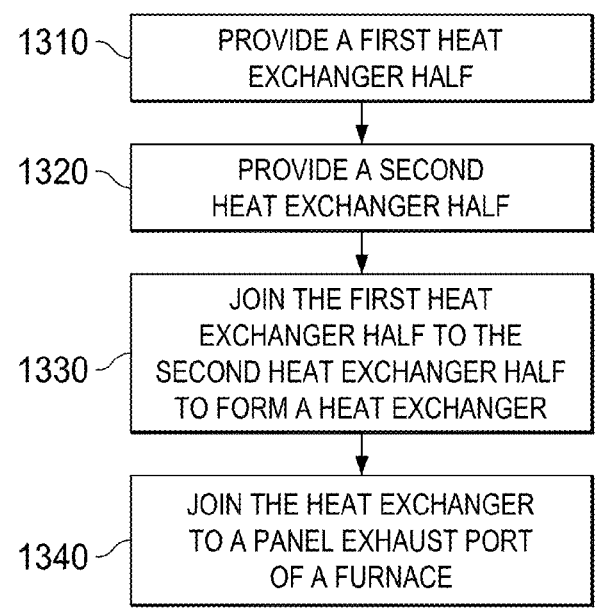
FIG. 13 presents a method of the disclosure.

Turning now to FIG. 13, illustrated is a method of the disclosure generally designated 1300. The method is described without limitation with respect to elements of FIGS. 3, 4A, 4B, 5A and 6D. The method 1300 begins with a step 1310, in which a first heat exchanger half, e.g. the first half 410, is provided. As used herein and in the claims, "provided" means that an item being provided may be manufactured by the individual or business entity performing the disclosed methods, or obtained thereby from a source other than the individual or entity, including another individual or business entity. The first heat exchanger half includes a first half of an exhaust channel and an inner joint flange half at an end thereof, e.g. the inner flange half 420.

In a step 1320, a second heat exchanger half, e.g. the second half 430, is provided. The second heat exchanger half includes a second half of the exhaust channel and an outer joint flange half at an end thereof, e.g., the outer flange half 440. The outer joint flange half includes first and second capturing tabs, such as the capturing tabs 535, 535'. Optionally, the first heat exchanger half and the second heat exchanger half are formed from aluminized steel sheet.

In a step 1330, the first heat exchanger half is joined to the second heat exchanger half. The joining forms an exhaust channel and a joint flange, e.g. the joint flange 310, at an end of the exhaust channel.

In an optional step 1340, the exhaust channel is joined to a vest panel or a collector box using a flare-crimp joint as described herein, e.g. using the reflare tool 710.

Those skilled in the art to which this application relates will appreciate that other and further additions, deletions, substitutions and modifications may be made to the described embodiments.

What is claimed is:

1. A method of forming a furnace heat exchanger assembly, comprising:
   providing a vest panel;
   providing a panel exhaust port in the vest panel, the panel exhaust port comprising a rim;
   providing a first heat exchanger half that includes a first half of an exhaust channel and an inner joint flange half at an end thereof, the inner joint flange half comprising first and second terminating portions;
   providing a second heat exchanger half that includes a second half of said exhaust channel and an outer joint flange half at an end thereof, said outer joint flange half having first and second capturing tabs, the first and second capturing tabs operable to overlap the first and second terminating portions respectively; and
   joining said first heat exchanger half to said second heat exchanger half such that said capturing tabs substantially and concentrically overlap said inner joint flange half to form a joint flange, wherein the inner and outer joint flange halves jointly comprise an outlet to the exhaust channel, and wherein the first and second capturing tabs and the first and second terminating portions are located along the circumference of the outlet;
   extending the outlet through the panel exhaust port;
   inserting a flaring body into the outlet to flare a portion of the outlet, first and second termination portions, and first and second capturing tabs around the rim of the panel exhaust port; and
   pushing a crimping body around the flaring body to crimp the portion of the outlet, first and second termination portions, and first and second capturing tabs around the rim of the panel exhaust port.

2. The method as recited in claim 1, wherein said inner joint flange half comprises a major portion with a first radius of curvature, and first and second terminating portions having a different second radius of curvature.

3. The method as recited in claim 2, wherein said outer joint flange half comprises a second major portion having said first radius of curvature, and said first and second capturing tabs have a second greater radius of curvature.

4. The method as recited in claim 1, wherein said first and second capturing tabs overlap said inner joint flange by at least about 2.5 mm.

5. The method as recited in claim 1, further comprising forming said first heat exchanger half and said second heat exchanger half from aluminized steel.

6. The method as recited in claim 1, further comprising joining said exhaust channel to a vest panel or collector box with a flare-crimp joint.

* * * * *